United States Patent
Weihrauch

(10) Patent No.: US 7,183,685 B2
(45) Date of Patent: Feb. 27, 2007

(54) ROTOR FOR AN ELECTRIC MOTOR

(75) Inventor: Niels Christian Weihrauch, Flensburg (DE)

(73) Assignee: Danfoss Compressors GmbH, Flensburg (DE)

( * ) Notice: Subject to any disclaimer, the term of this patent is extended or adjusted under 35 U.S.C. 154(b) by 0 days.

(21) Appl. No.: 10/539,835

(22) PCT Filed: Dec. 12, 2003

(86) PCT No.: PCT/DK03/00863

§ 371 (c)(1),
(2), (4) Date: Jun. 17, 2005

(87) PCT Pub. No.: WO2004/057737

PCT Pub. Date: Jul. 8, 2004

(65) Prior Publication Data

US 2006/0082236 A1    Apr. 20, 2006

(30) Foreign Application Priority Data

Dec. 19, 2002  (DE)  ................ 102 61 760

(51) Int. Cl.
*H02K 1/27*  (2006.01)
*H02K 1/22*  (2006.01)
*H02K 21/12*  (2006.01)

(52) U.S. Cl. .................... 310/156.78; 310/156.53; 310/211; 310/216

(58) Field of Classification Search ................ 310/211, 310/212, 156.53, 156.56, 156.38, 156.39, 310/156.44–156.46, 156.78, 216
See application file for complete search history.

(56) References Cited

U.S. PATENT DOCUMENTS

| | | | | |
|---|---|---|---|---|
| 4,322,648 A * | 3/1982 | Ray et al. | .............. | 310/156.55 |
| 4,476,408 A * | 10/1984 | Honsinger | ............. | 310/156.84 |
| 4,631,435 A * | 12/1986 | McCarty | ................. | 310/156.77 |
| 6,727,627 B1 * | 4/2004 | Sasaki et al. | ............... | 310/211 |
| 2003/0071533 A1 * | 4/2003 | Kikuchi et al. | ............. | 310/211 |

FOREIGN PATENT DOCUMENTS

| | | | | |
|---|---|---|---|---|
| DE | 198 51 883 A1 | 5/2000 | | |
| EP | 0 809 343 B1 | 11/1997 | | |
| EP | 1 164 684 A2 | 12/2001 | | |
| GB | 177247 | * 1/1970 | ............. | 310/156.78 |
| JP | 4210758 | * 7/1992 | ............. | 310/156.78 |
| JP | 2000-60039 | 2/2000 | | |
| JP | 2000-102198 | 4/2000 | | |
| JP | 2001-69701 | 3/2001 | | |
| WO | WO 01/06624 A1 | 1/2001 | | |
| WO | WO2004057726 A1 | * 7/2004 | ............. | 310/156.78 |

* cited by examiner

*Primary Examiner*—Tran N. Nguyen
(74) *Attorney, Agent, or Firm*—McCormick, Paulding & Huber LLP

(57) ABSTRACT

The invention relates to a rotor for an electric motor, particularly an electric line-start motor, comprising axially accommodating spaces (4 to 6) for conductor rods, and axially extending receiving spaces (10, 11) for permanent magnets (14, 15), which are-designed and located in such a way that they generate a permanent magnet field with a magnet axis (22) and a neutral axis (23). The aim of the invention is to ensure that the rotor runs as regularly as possible during the operation of the electric motor. To this end, the diameter of the rotor along the magnet axis is larger than that along the neutral axis (23).

8 Claims, 4 Drawing Sheets

ROTOR FOR AN ELECTRIC MOTOR

CROSS REFERENCE TO RELATED APPLICATIONS

This application is entitled to the benefit of and incorporates by reference essential subject matter disclosed in international Patent Application No. PCT/DK2003/000863 filed on Dec. 12, 2003 and German Patent Application No. 102 61 760.0 filed on Dec. 19, 2002.

FIELD OF THE INVENTION

The invention concerns a rotor for an electric motor, particularly an electric line-start motor.

BACKGROUND OF THE INVENTION

The term electric line-start motor is used for hybrid a.c. motors, which represent a combination of an a.c. asynchronous motor with an a.c. synchronous motor. Such an electric line-start motor comprises a stator with several stator windings. The stator windings generate a rotating field, which generates a voltage in a rotor, which causes the rotor to rotate. The rotor of an electric line-start motor comprises features of both the rotor of an a.c. asynchronous motor and of the rotor of an a.c. synchronous motor. Line-start motors can also be dimensioned for one-phase mains supply, if required using an operating capacitor.

In the rotor of an a.c. asynchronous motor, which can also be called induction motor, conductor rods, for example of aluminium or copper, are located substantially in the axial direction. At the front sides of the rotor, the conductor rods can be connected by short-circuit rings. Together with the short-circuit rings, the conductor rods form the rotor winding and can have the shape of a cage, which is the reason why such a rotor is also called a squirrel cage rotor. During operation, the rotating field of the stator winding causes a current change in the conductor loops of the initially still standing rotor. The current change speed is proportional to the rotational speed of the rotating field. The induced voltage permits current to flow into the rotor conductor rods connected by short-circuit rings. The magnet field generated by the rotor current causes a torque, which drives the rotor in the rotation direction of the stator rotating field. When the rotor would reach the rotational speed of the stator rotating field, the current change in the conductor loop concerned, and thus also the torque causing the rotation, would be zero. Therefore, in a.c. asynchronous motors, the rotor speed is always smaller than the rotating field speed. Thus, the speed of the rotor is not mechanically synchronous with the rotating field speed.

In the rotor of an a.c. synchronous motor, for example, permanent magnets can be located, which generate a magnetic rotor rotational field during operation. When the stator winding is provided with alternating current, the poles of the rotor are attracted by the counter-poles of the stator rotating field and shortly after repulsed by its uniform poles. Due to its mass inertia, the rotor cannot immediately follow the stator speed. When, however, the rotor has almost reached the speed of the stator rotating field, the rotor is, in a manner of speaking, pulled into the stator rotating field speed and runs on at that speed. This means that after the start of the rotor, the rotor runs synchronously with the stator rotating field speed.

The rotor of an electric line-start motor comprises both permanent magnets and conductor rods. The conductor rods form a starting aid for the rotor. When the speed of the stator rotating field has almost been reached, the permanent magnets evolve their effect. Thus, the electric line-start motor combines the good starting properties of an asynchronous motor, that is, large starting torque, with the high efficiency of the synchronous motor. When starting the motor, the conductor rods evolve their effect, whereas actually the permanent magnets only have an interfering effect during the start of the motor. In synchronous operation, however, for example at 50 Hz or 3000 rpm, the permanent magnets evolve their effect, whereas the conductor rods no longer contribute to the generation of the torque, as no voltage is induced into the conductor rods during synchronous operation.

The magnetic field existing in an air gap between the rotor and the stator during operation of the electric line-start motor comprises two components. The first component of the resulting field is caused by the stator windings. This is also called rotating field. The second component of the resulting field is caused by the permanent magnets. During operation of traditional electric line-start motors, as known from, for example, WO 01/06624 A1, torque fluctuations may occur, which are not desired.

SUMMARY OF THE INVENTION

One object of the invention is to provide a rotor according to the preamble of claim 1, particularly for an electric motor according to the preamble of claim 8, which makes the magnetic field approximately sine-shaped during synchronous operation.

With a rotor for an electric motor, particularly an electric line-start motor, with accommodating spaces for conductor rods extending in the axial direction and with receiving spaces for permanent magnets extending in the axial direction, the permanent magnets being located and designed so that they generate a permanent magnet field with a magnet axis and a neutral axis, this task is solved in that the diameter of the rotor is larger along the magnet axis than along the neutral axis. Thus, the rotor has a circular cross-section, whose thickness along the magnet axis is slightly larger than along the neutral axis. The differently large rotor diameters or rotor thicknesses, respectively, cause that the distance between the outer circumference of the rotor and a stator surrounding the rotor with an accommodating space for the rotor having a circular cross-section is no longer constant as in traditional electric motors. With the embodiment of the rotor according to the invention, the distance between the outer circumference of the rotor and the stator varies in dependence of the rotation angle of the rotor. Accordingly, the air gap between rotor and the stator is largest along the neutral axis and smallest along the magnet axis. During synchronous operation of the electric motor, the variation of the size of the air gap between rotor and stator results in an approximately sine-shaped course of the electric field strength of the magnet field generated by the permanent magnets over the rotation angle of the rotor. This reduces the surface losses in the rotor. With the rotor and the electric motor, respectively, according to the invention, the starting torque and the tilting torque are larger than with traditional electric line-start motors.

Further, a comparison between a conventional line-start motor and the line-start motor according to the invention has shown that a non-circular rotor has a larger magnetic flux density in the rotor than a conventional rotor. Concretely, this means that the amplitude of the magnetic basis tone is increased, thus contributing to a larger torque. This again means that the amount of consumed magnet material can be reduced.

A preferred embodiment of the rotor is characterised in that the diameter of the rotor along the magnet axis is maximum 2 mm larger than along the neutral axis. This means that the rotor thickness along the magnet axis is slightly larger than along the neutral axis. Thus, the cross-section of the rotor is no longer circular, but slightly oval. The stated limit value of 2 mm refers to a rotor diameter of approximately 60 mm. Tests performed within the frames of the present invention have shown that larger diameter differences or thickness differences, respectively, will influence the function of the rotor or the electric motor, respectively.

A further preferred embodiment of the rotor is characterised in that the diameter of the rotor along the magnet axis is 0.5 to 1 mm larger than along the neutral axis. Tests performed within the frames of the present invention have shown that the best results are achieved with these values.

A further preferred embodiment of the rotor is characterised in that in the cross-section the rotor has the shape of an ellipse, whose main axis covers the magnet axis and whose auxiliary axis covers the neutral axis.

A further preferred embodiment is characterised in that the receiving spaces for the permanent magnets are made to be curved and located around the rotational axis of the rotor in such a manner that, in a cross-sectional view through the rotor, the distance between the receiving spaces for the permanent magnets and the accommodating spaces for the conductor rods are larger in the area of the magnet axis than in the area of the neutral axis. This provides sufficient space for the field lines of the magnet field generated by the stator.

A further preferred embodiment of the rotor is characterised in that, in a cross-sectional view through the rotor, the receiving spaces for the permanent magnets have the shape of bows, which are located in the shape of an ellipse, whose main axis covers the neutral axis and whose auxiliary axis covers the main axis. With regard to the distribution of the magnet field lines during operation of the device according to the invention, this arrangement has proved to be advantageous.

A further preferred embodiment of the rotor is characterised in that the permanent magnets are rod-shaped, substantially forming two half circles around a through-hole in the rotor. Thus, a cost-effective manufacturing can be achieved, as rod magnets are cheaper than curved magnets.

With an electric motor, particularly an electric line-start motor, with a stator comprising a plurality of windings and a rotor accommodating space with a particularly circular cross-section, the task mentioned above is solved in that a rotor as described above is accommodated in the rotor accommodating space. Due to the approximately sine-shaped course of the magnet field strength of the permanent magnet field over the rotor rotation angle, the rotor according to the invention causes a higher efficiency of the electric motor according to the invention.

BRIEF DESCRIPTION OF THE DRAWINGS

Further advantages, features and details of the invention appear from the following description, in which different embodiment examples are described in detail with reference to the drawings, showing.

DETAILED DESCRIPTION OF THE PREFERRED EMBODIMENTS

Figure 1:
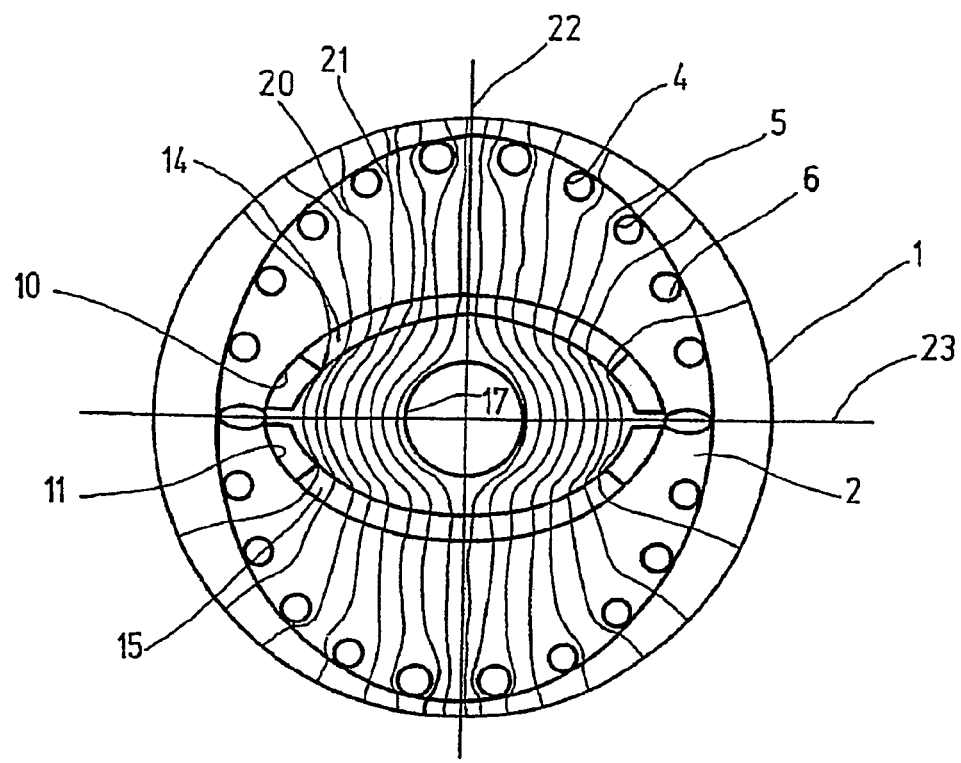
FIG. 1 is a cross-sectional view through an electric motor according to a first embodiment of the invention with curved permanent magnets.

FIG. 1 shows a cross section of a rotor accommodating space 1 of the stator by way of a circle. A rotor 2 is accommodated to be rotatable in the rotor accommodating space. The rotor 2 has an ellipse-shaped cross-section. Near the outer circumference of the rotor 2, the accommodating spaces 4, 5, 6 are distributed evenly on the circumference; of the rotor 2. Each accommodating space 4, 5 and 6 for conductor rods has a circular cross-section. Radially inside the accommodating spaces 4 to 6 for conductor rods are located receiving spaces 10 and 11 for permanent magnets. The receiving spaces 10 and 11 for permanent magnets extend, like the accommodating spaces 4 to 6 for conductor rods, in the axial direction of the substantially circle cylinder shaped rotor 2. The receiving spaces 10 and 11 for permanent magnets are arranged and formed to be curved around the rotation axis of the rotor. The receiving spaces 10 and 11 have the shape of bows, which are arranged in the shape of an ellipse.

In its centre, the rotor has a central through-hole 17, which serves the adoption of a shaft, which can be unrotatably connected with the rotor 2. The torque generated by the electric motor can be supplied via the shaft (not shown).

The receiving spaces 10 and 11 accommodate permanent magnets 14 and 15, which generate a permanent field. The magnet field generated by the permanent magnets 14 and 15 is shown in FIG. 1 by means of magnet field lines 20, 21. The permanent magnet field generated by the permanent magnets 14 and 15 has a magnet axis 22 and a neutral axis 23. The magnet field strength is largest along the magnet axis 22. Along the neutral axis 23, the magnet field strength of the permanent magnet field is equal to zero.

Along the magnet axis 22 the rotor 2 has a larger thickness than along the neutral axis 23. Consequently, the outer circumference of the rotor 2 has the shape of an ellipse, whose main axis covers the magnet axis 22 and whose auxiliary axis covers the neutral axis 23. The ellipse formed by the receiving spaces 10 and 11 for the permanent magnets 14 and 15 is perpendicular to the ellipse forming the outer circumference of the rotor 2. The main axis of the ellipse formed by the receiving spaces 10 and 11 covers the neutral axis 23. The auxiliary axis of the ellipse formed by the receiving spaces 10 and 11 covers the magnet axis 22.

The use of a rotor, which has a larger diameter or a larger thickness, respectively, in the direction of the magnet axis 22 of the permanent magnets 14 and 15 than in the direction of the neutral axis 23, causes that the distance between the rotor 2 and the rotor accommodating space 1 of the stator varies, that is, the air gap formed between the rotor 2 and the rotor accommodating space 1 of the stator is variable. The air gap is smallest along the magnet axis 22 and largest along the neutral axis 23.

In the embodiment shown in FIG. 1, the permanent magnets 14 and 15 d o not fill the complete cross-section of the receiving spaces 10 and 11. The empty or air-filled, respectively, parts of the receiving spaces 10 and 11 generate no magnet field, which appears from the course of the magnet field lines 20, 21. The distance between the magnet field lines in the air gap between the rotor 2 and the rotor accommodating space 1 of the stator is a measure of the electrical field strength. FIG. 1 shows that the magnet field strength is largest, where the rotor 2 is located very close to the rotor accommodating space 1 of the stator. To the right and to the left of the magnet axis 22 the magnet field generated by the permanent magnets 14 and 15 becomes weaker, which is desired. Thus, it is achieved that the magnet field strength in the air gap between the rotor 2 and the rotor accommodating space 1 of the stator assumes an approximate sine-shape in dependence of the rotation angle of the rotor.

Figure 2:
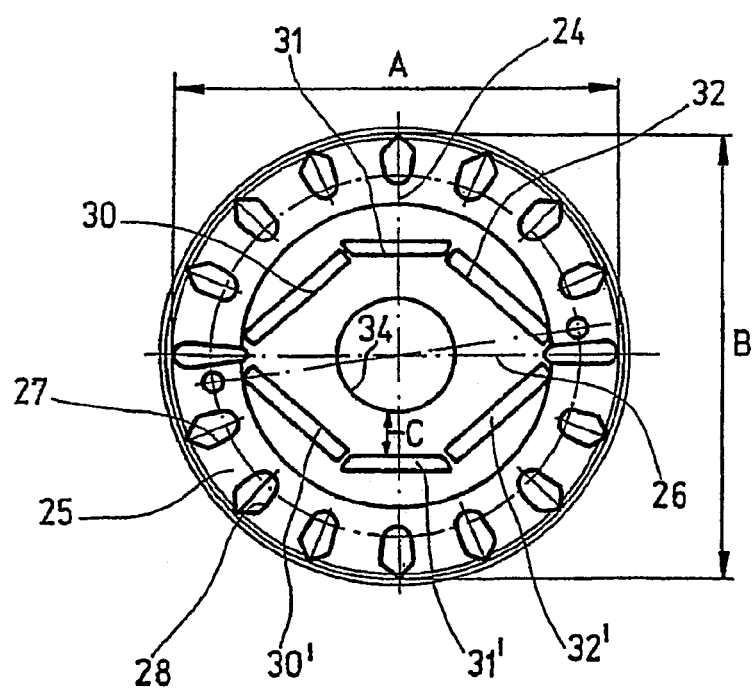
FIG. 2 is a cross-sectional view of a rotor according to a further embodiment of the invention with straight permanent magnets.

FIG. 2 shows a cross-section of a rotor 25 having in the area of the neutral axis 26 of the permanent magnet field a thickness of 60.34 mm and in the area of the magnet axis 24 of the permanent magnet field a thickness of 61.3 mm.

The rotor shown in FIG. 2 comprises accommodating spaces for conductor rods, whose cross-sections are not circular. Tests made within the frames of the present invention have proved that the cross-section of the accommodating spaces 27 and 28 for conductor rods shown in FIG. 2 are advantageous. Receiving spaces 30, 31 and 32 for permanent magnets are located radially inwards in relation to the accommodating spaces 27 and 28 for the conductor rods. The receiving spaces 30 to 32 are not curved but straight, each having the shape of an elongate rectangle. In relation to the neutral axis 26, receiving spaces 30', 31' and 32' are arranged symmetrically to the receiving spaces 30, 31 and 32. The receiving-spaces 30, 31, 32 and 30', 31', 32 are arranged in parallel in pairs, so that a distance C between a through-bore 34 for a shaft and the receiving space 31 or 31' respectively is given.

Figure 3:
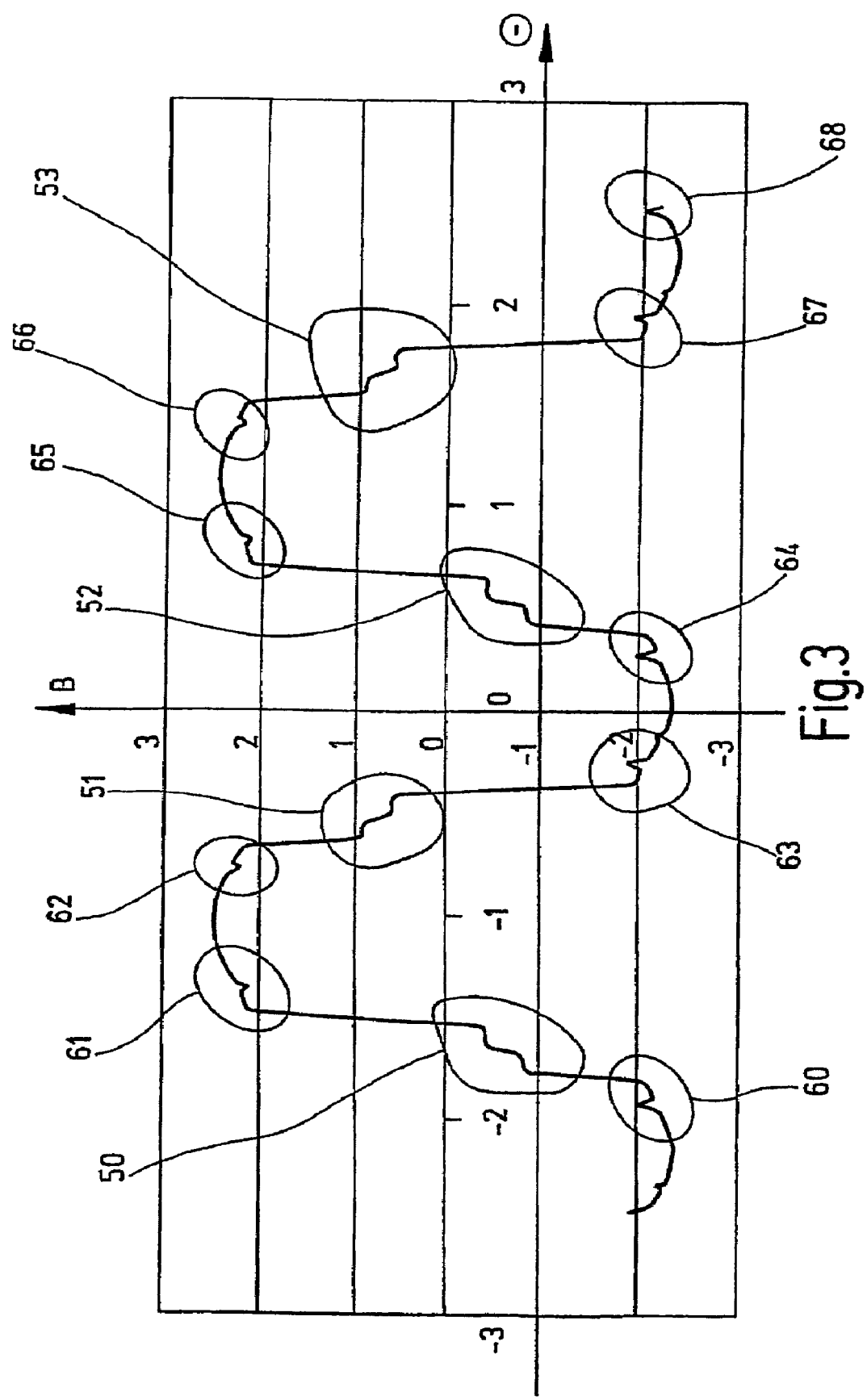
FIG. 3 is a diagram showing the course of the magnetic field strength B over the rotation angle of the rotor.

FIG. 3 shows the course of the magnet field strength B over the rotation angle θ. With traditional electric line-start motors an angular course often occurs, which is not ideal. Ideal would be a sine-shaped course. As can be seen particularly in the areas 50 to 53 and 60 to 68, the embodiment according to the invention will cause an approach to the ideal sine-shaped course. The sine-shaped course in FIG. 3, however, is only achieved during the synchronous operation of the electric line-start motor, not when starting the electric line-start motor, when the rotor runs asynchronously. In the starting phase, the non-circular shape of the rotor causes the starting torque to increase, however, at the same time the efficiency decreases slightly. As, however, the starting phase is relatively short, this disadvantage is accepted.

Figure 4:
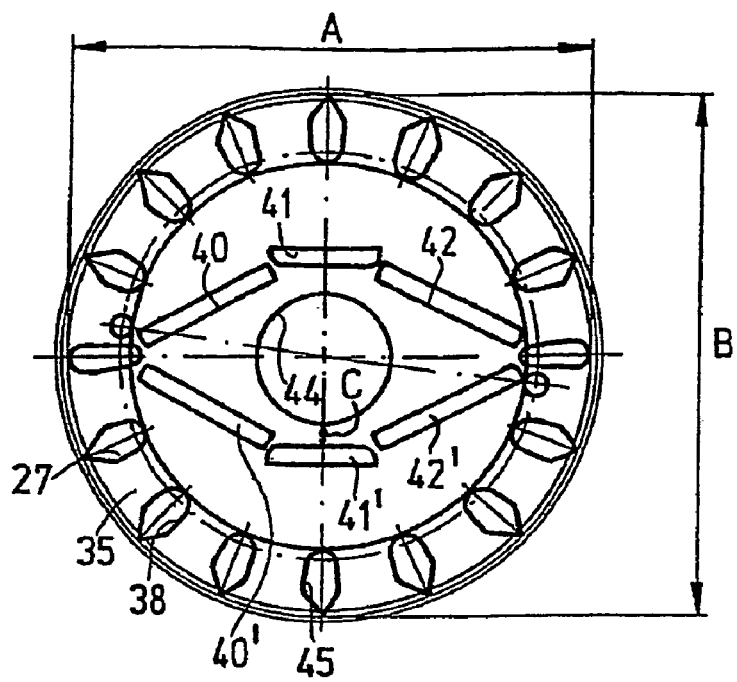
FIG. 4 is a cross-sectional view of a rotor according to a further embodiment of the invention with straight permanent magnets.

FIG. 4 shows a cross-section of a rotor 35 according to a further embodiment of the invention. The rotor 35 is similar to the rotor 25 shown in FIG. 2. For designating same parts, FIG. 4 has reference numbers increased by ten. However, with the rotor 35 shown in FIG. 4, the distance C between the through-bore 44 and the accommodating space 41' is smaller than in the embodiment shown in FIG. 2. Thus, a larger distance occurs between the accommodating space 41' and the accommodating space 45 for a conductor rod located on the radial outside, which has turned out to be advantageous during operation.

Figure 5:
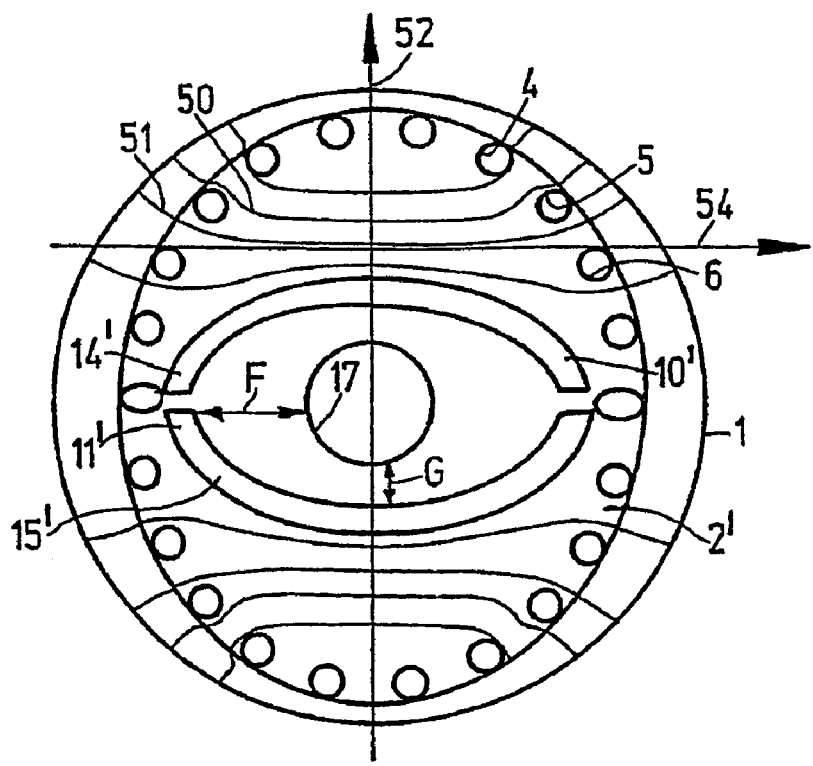
FIG. 5 is a cross-sectional view of a rotor according to a further embodiment of the invention with curved permanent magnets.

FIG. 5 is a cross-sectional view of a rotor 2', which is similar to the rotor 2 in FIG. 1. However, the receiving spaces 10' and 11' are completely filled by permanent magnets 14' and 15'. Further, FIG. 5 shows magnet field lines 50, 51 of the magnet field generated by the stator windings (not shown). The magnet axis of the magnet field generated by the stator windings has the reference number 54. Perpendicularly to this extends the magnet axis 52 of the permanent magnet field generated by the permanent magnets 14' and 15'. In the area of the intersections with the magnet axis 52, the curvature radii of the permanent magnets 14' and 15' are clearly larger than at the ends of the permanent magnets. The result is that the distance F between the passage 17 and the permanent magnets 14', 15' is clearly larger than the distance G.

Figure 6:
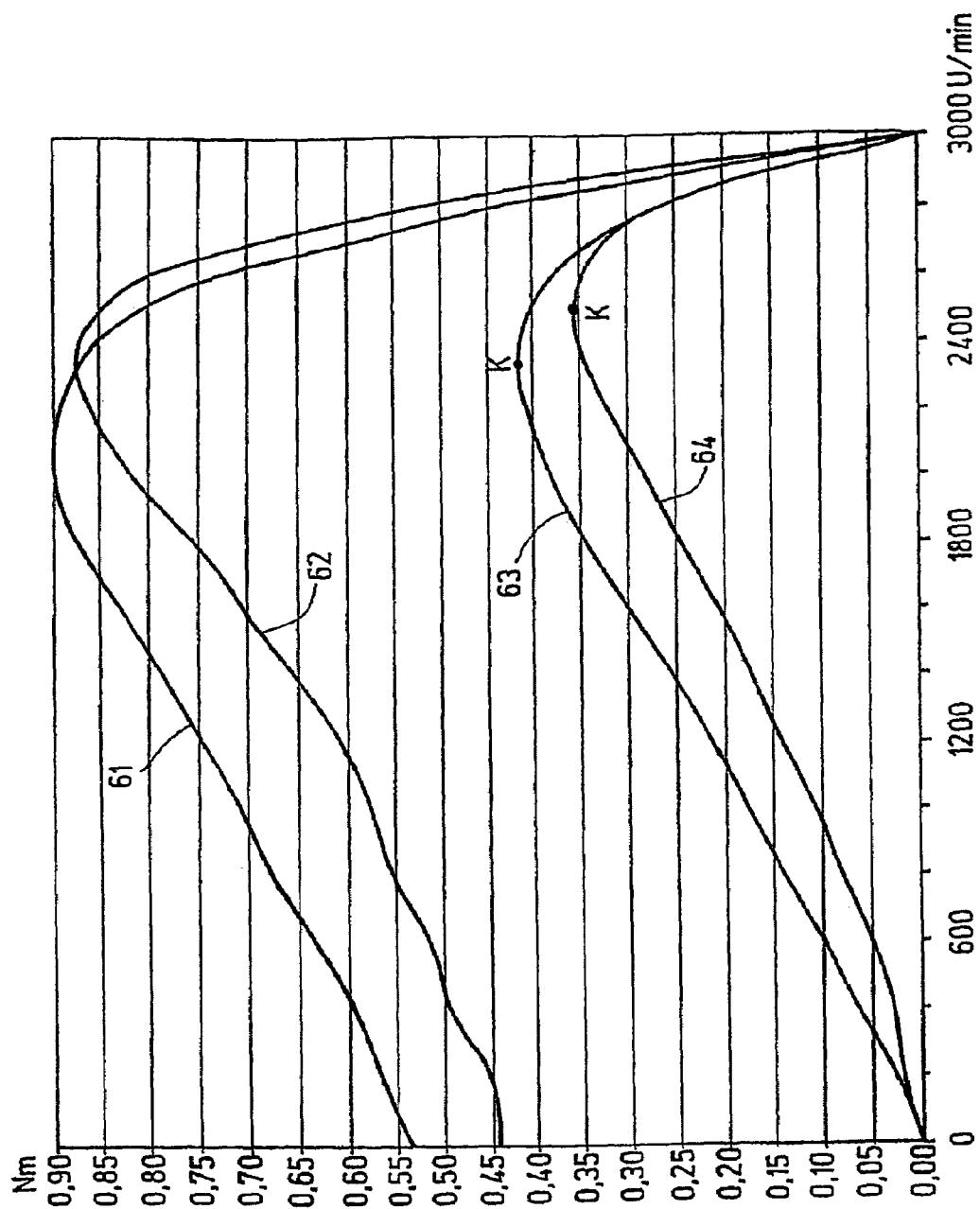
FIG. 6 is a diagram showing the course of the torque over the rotor speed.

FIG. 6 shows the course of the torque in Newton meters over the speed in rounds per minute. 61 is the course of the torque of an electric line-start motor with starting capacitor and a rotor according to the invention. Compared to this, 62 shows the torque course of a conventional electric line-start motor with starting capacitor. FIG. 6 shows that the starting torque of the electric motor 61 according to the invention is higher than that of the traditional electric line-start motor 62.

63 in FIG. 6 shows the course of the torque of an ordinary asynchronous motor without starting capacitor with a non-circular rotor. In comparison to this, 64 is the torque course of a traditional asynchronous motor without starting capacitor. As seen in FIG. 6, the tilting torque K occurs at a lower speed with a non-circular rotor than with a traditional rotor. With line-start motors, the curves in FIG. 6 would have approximately the same shape, only would they have a larger ripple.

The increase in the starting torque or the tilting torque, respectively, is caused by the enlargement according to the invention of the air gap in the area of the neutral axis. The larger air gap causes that the impedance of the electric motor is reduced, which causes the motor to consume a larger current, which increases the torque. The reduction of the motor impedance is caused by the fact that the magnet field generated by the stator is exposed to a larger air volume, which causes that the system has a larger ohmic share and thus gets faster. The reactance gets smaller and the ohmic share R becomes a, relatively considered, larger weight. The efficiency drops, but the torque increases, as the smaller reactance brakes the current increase less heavily. With the electric line-start motor according to the invention, the current increases faster, this gives a higher torque than with traditional electric line-start motors.

The rotor lamination can consist of different sheet laminates, for example a first laminate and a second laminate. The laminate sequence can be as follows: first: laminate, second laminate, first laminate, that is, the rotor is divided into three sections. The second laminate forms a transition zone. The transition zone serves the purpose of achieving a so-called helical groove, that is, a conductor rod in a first end of the rotor is offset in relation to the conductor rod in the other end of the rotor. The offsetting, for example between 10 and 20 mechanical degrees, is achieved in the transition zone, in that the conductor rod does not run in parallel with the rotation axis of the rotor, but laterally sloped. Due to the helical groove, the amplitude of interfering magnetic harmonics in the rotary field are heavily reduced, which is desired. The transition zone consists of, for example, 10 to 20 sheet laminates, whose accommodating spaces are offset in relation to each other.

A further advantage of the electric line start motor according to the invention is seen in that the losses on the surface of the rotor are smaller than with traditional electric line-start motors. Usually, the magnet field in the air gap comprises several harmonic frequencies, which cause losses in the motor. Here, so-called zigzag losses are concerned, which occur on the surface of the rotor. The larger air gap at some places between the rotor and the stator causes that these losses are reduced.

While the present invention has been illustrated and described with respect to a particular embodiment thereof, it should be appreciated by those of ordinary skill in the art that various modifications to this invention may be made without departing from the spirit and scope of the present invention.

The invention claimed is:

1. A rotor for an electric motor with axially extending accommodating spaces for conductor rods and with axially extending receiving spaces for permanent magnets, designed and located so that they generate a permanent magnet field with a magnet axis and a neutral axis, wherein the diameter of the rotor is larger along the magnet axis than along the neutral axis.

2. The rotor according to claim 1, wherein the diameter of the rotor along the magnet axis is maximum 2 mm larger than along the neutral axis.

3. The rotor according to claim 2, wherein the diameter of the rotor along the magnet axis is 0.5 to 1 mm larger than along the neutral axis.

4. The rotor according to claim 1, wherein in the cross-section the rotor has the shape of an ellipse, whose main axis covers the magnet axis and whose auxiliary axis covers the neutral axis.

5. The rotor according to claim 1, wherein the receiving spaces for the permanent magnets are made to be curved and located around the rotational axis of the rotor in such a manner that, in a cross-sectional view through the rotor, the distance between the receiving spaces for the permanent magnets and the accommodating spaces for the conductor rods are larger in the area of the magnet axis than in the area of the neutral axis.

6. The rotor according to claim 1, wherein in a cross-sectional view through the rotor, the receiving spaces for the permanent magnets have the shape of bows, which are located in the shape of an ellipse, whose main axis covers the neutral axis and whose auxiliary axis covers the main axis.

7. The rotor according to claim 1, wherein the permanent magnets are rod-shaped, substantially forming two half circles around a through-hole in the rotor.

8. An electric motor comprising:
a stator comprising a plurality of windings and a rotor accommodating space; and
a rotor with axially extending accommodating spaces for conductor rods and with axially extending receiving spaces for permanent magnets, designed and located so that they generate a permanent magnet field with a magnet axis and a neutral axis, wherein the diameter of the rotor is larger along the magnet axis than along the neutral axis;
wherein the rotor is accommodated to be rotatable in the rotor accommodating space.

* * * * *